Oct. 21, 1947.  J. P. PHILLIPS ET AL  2,429,426

PISTON SEAL

Filed Sept. 14, 1942

INVENTORS
JOHN P. PHILLIPS
LOUIS F. RIDDER JR.
BY H. W. Brelsford
ATTORNEY

Patented Oct. 21, 1947

2,429,426

UNITED STATES PATENT OFFICE 2,429,426

PISTON SEAL

John P. Phillips and Louis F. Ridder, Jr., North Hollywood, Calif., assignors, by mesne assignments, to Bendix Aviation Corporation, South Bend, Ind., a corporation of Delaware Application September 14, 1942, Serial No. 458,184

6 Claims. (Cl. 309—4)

This invention relates to pistons and bushings for fluid motors and fluid actuated devices, and relates more particularly to a seal design for pistons and bushings made of organic plastic material.

It has been discovered that increased performance and longer life results from the replacement with plastic material of parts of relatively reciprocating assemblies previously made of metal. When a piston reciprocating within a cylinder is made of plastic material, the metal of the cylinder is but very lightly scored. In fact, certain tests indicate that no scoring whatsoever results when all metal chips and particles are removed from the assembly.

This lack of scoring has several important results. Fluid seals on pistons of the standard O ring type have a life which is directly dependent upon the scoring of the cylinder walls. When this scoring is reduced or eliminated, the seal life is greatly extended, insuring satisfactory sealing for the life of the article. A second result of the lack of scoring is that it permits the use of softer metals. This in turn permits the use of the lighter metal cylinder barrels, such as aluminum and magnesium alloys, which as a rule are always much softer than steel. The prevalence of scoring is so common with metal pistons that recent Government specifications require hard steel cylinder barrels to reduce the effect. With the use of plastic pistons, however, cylinders of aluminum alloy are used with equal or better results than steel barrels with metal pistons. Thus, the plastic pistons permit the use of the light metals, resulting in a great saving in weight, which is very important in aircraft.

The use of plastics also reduces the wear on cylinder barrels and the relative wear between piston and cylinders. This decreased wear has been found to be very substantial and results in a greatly increased life of the piston and cylinder assembly.

The use of plastics in bushings has the same advantages as in pistons. The bushings may be in a fluid actuated device such as an actuating cylinder for aircraft, or in a fluid pump such as an airplane hand pump. The scoring of the piston rod is reduced, increasing seal life. Also, the plastic bushing reduces wear, and on one design tested, the wear was reduced approximately one-half as compared to a bronze bushing.

These advantages are not limited to reciprocating motion, but apply equally well where there is rotary motion. Therefore, the invention should be considered as applying also to rotary motion.

The use of plastics, however, produces new problems. Although fairly strong in compression, most commonly available plastics are weak in tension. To eliminate this trouble, plastics have been used which are reinforced with fabric such as linen or canvas. This, however, gives strength in two dimensions only, since no satisfactory three-dimensional fabric is commercially available. The plastic pistons used are therefore prone to crack and fail in the unreinforced third dimension.

The present invention overcomes these difficulties. First, by providing seals which relieve the stress on the unreinforced dimension, and secondly, by cutting the fabric-reinforced plastic at an angle to the laminations to give substantial strength in all dimensions.

It is therefore an object of the invention to provide a plastic member of a reciprocating assembly which has seals so designed as to relieve stresses in one dimension.

It is another object of the invention to provide a reinforced plastic member of a reciprocating assembly which is so formed with respect to the reinforcements that stresses in the weakest direction are reduced.

It is another object to provide a plastic piston with a cylinder seal and a piston rod seal in substantially the same plane.

It is another object to provide a plastic bushing with a piston rod seal and casing seal in substantially the same plane.

Another object is to provide a bushing or piston made from laminated material, formed at an angle with respect to the laminations.

Another object is to provide a plastic member in an assembly where there is relative movement, with a seal arrangement which relieves fluid stresses in certain directions.

In the drawings forming a part of this specification:

Figure 1:
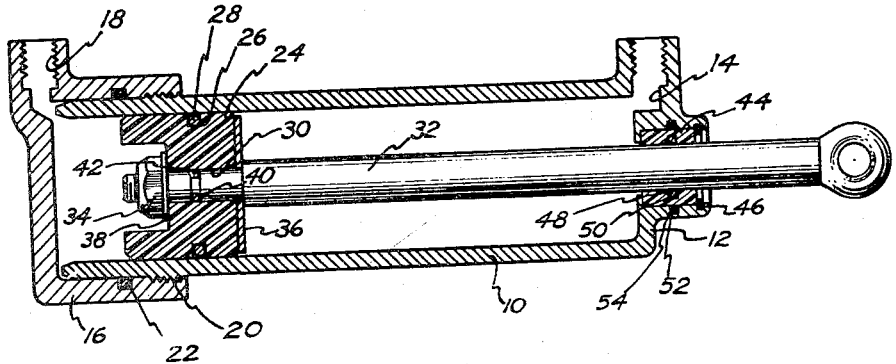
Figure 1 is an elevation view in full section of an aircraft actuating cylinder embodying the plastic piston and plastic bushing of this invention.

Referring to Figure 1, the actuating cylinder comprises a cylinder barrel 10 having an end wall 12 formed integrally therewith including a fluid passage 14. The left end of cylinder 10 is closed by a cup shaped end member 16 having a fluid passage 18 therein and threaded to cylinder 10 at 20 and including a seal 22 to prevent leakage at the joint.

Reciprocable within cylinder 10 is a piston 24 formed of organic plastic material such as a laminated fabric impregnated with the condensation product of phenol and formaldehyde. The laminations may be in a plane parallel to the axis of the piston since this is the most economical lamination position when forming pistons from stock material. Piston 24 has an external annular groove 26 in which is placed an O ring seal 28 such as is well known in the art and fully described in Christensen Patent No. 2,180,795.

Passing through a hole 30 in piston 24 is a piston rod 32, secured thereon by a nut 34 threaded onto the left end and compressing the piston 24 between a washer 36 and a washer 38. Piston rod 32 has an external annular groove 40 formed in the part passing through piston 24, and a sealing ring 42 is placed therein.

Piston rod 32 passes through end wall 12, in which is provided a plastic bushing 44 held in place by a snap ring 46. The inside face of bushing 44 has a groove 48 formed therein in which is placed an O ring seal 50. Bushing 44 is sealed against wall 12 by a seal 52 placed in a groove 54 formed in end wall 12.

In operation, the actuating cylinder of Figure 1 is double acting. Fluid under pressure may be introduced through the passage 14, at which time passage 18 is connected to exhaust. When fluid under pressure fills the space to the right of piston head 24, the fluid makes its way along hole 30, between the piston 24 and piston rod 32. If no seal were provided therein, the fluid pressure would be effective over the whole area of hole 30, producing a radial force thereagainst. On the part of piston 24 to the right of cylinder seal 28 this pressure would be equalized because the full pressure would be effective against the outer surface of the piston up to seal 28. However, on the part of the piston 24 to the left of seal 28 there would be no corresponding equalizing pressure since that part is subject to exhaust pressure. Consequently, there would be a tendency for the part of the piston 24 to the left of seal 28 to burst, due to the higher radial pressure acting against the surface of hole 30.

To prevent this from happening, the seal 42 is provided, which is substantially in the same plane as cylinder seal 28. This prevents the full fluid pressure from being effective any farther along hole 30 than the full fluid pressure is effective on the outside of the piston 24. There will therefore be no portion of the plastic piston 24 which is subject to unequal radial pressures tending to burst it. As stated before, the plastic material is sufficiently strong in compression so that there is no tendency for breakage or rupture due to compressive or shear forces.

When it is desired to reverse the direction of movement of piston 24, pressure fluid is introduced onto the left end of cylinder 10 and the right end is connected to exhaust. The invention operates in a similar manner in this instance to eliminate any unequalized bursting pressure. In the past it has been common to provide a seal at one end or the other of hole 30, but it can readily be seen that although this seal would be effective in one direction it would not be effective in the opposite direction to prevent bursting. The bursting may also be eliminated by providing a seal at each end of hole 30 as will be explained later, but the invention as described replaces such a construction of two seals with one seal.

The operation of the cylinder of Figure 1 affects the bushing 44 in a manner similar to the piston 24. There it will be noted that seal 54 is also in substantially the same plane as the seal 48, preventing any unbalanced pressure between end wall 12 and bushing 24 from compressing the bushing inwardly. In the case of bushing 44 there is less of a tendency of bursting than in the case of the less restrained piston 24, and the action is more of a compressive action which would tend to bind the piston rod 32 and cause increased wear. The bushing 44 may be subject to reverse pressures, as for example when the entire actuating assembly is actuated by pneumatic pressures which are super-atmospheric on one side and sub-atmospheric on the other side of piston 24.

Piston 24 of Figure 1 may be made of laminations which are parallel to a plane through the axis of the cylinder 10. Such fabric may be represented by the cross-hatch lines of Figure 1. If, however, the laminations are made in a plane which is perpendicular to the axis of cylinder 10 there is a tendency for the piston to spread transversely when under fluid pressure. No amount of initial compression of such a piston prevents this spreading because of the very small elastic stretch of the plastic material. Accordingly, it has proved unsatisfactory to use laminated plastic pistons wherein the laminations are in planes perpendicular to the axis of cylinder 10.

Figure 2:
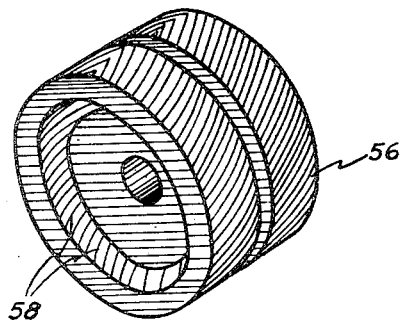
Figure 2 is an enlarged isometric view of a laminated plastic piston similar to the piston of Figure 1 showing the angle at which the piston is cut with respect to the laminations.

Shown in Figure 2 is a piston 56 similar to that of Figure 1, wherein laminations 58 of the plastic material are parallel to a plane approximately 45° to the longitudinal axis of the piston. This construction of inclined laminations, relative to the various pressures which may act upon the piston, results in a structure which resists bursting and resists longitudinal compression and tension forces to which a piston is subject. Although not as strong as the piston of Figure 1, it satisfactorily serves all the purposes and has a high test pressure which allows a large margin of safety. No seal whatsoever is necessary for the hole through the piston if leakage therethrough is not a matter to be considered. If a seal is necessary it makes little difference at which point in the hole it is placed. Another important feature of the piston of Figure 2 which forms a part of this invention is that laminated plastics cut at an angle of approximately 45° have a much smoother finish than laminated plastics cut about an axis through which the plane of the laminations passes, or transversely thereto. Thus the present piston is especially suited for constructions where minute tolerances are required.

Figure 3:
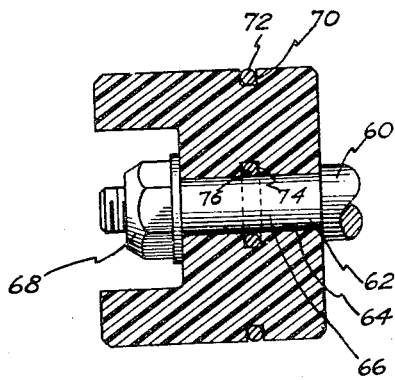
Figure 3 is an enlarged view in full section of a modification of the piston used in Figure 1.

The piston of Figure 3 differs from the piston of Figure 1 in that the piston rod seal is placed in the piston itself rather than in the piston rod as shown in Figure 1. A piston rod 60 has a reduced portion 62 passed through a hole 64 in a piston 66. A nut 68 threaded on reduced portion 62 holds the piston to the piston rod. Cut in the exterior of piston 66 is an external annular groove 70 in which is placed a sealing ring 72 to seal the piston against a cylinder in which it may be placed. Cut in hole 64 in piston 66 is an internal annular groove 74 in which is placed a seal 76, sealing the piston rod and the piston. It will be noticed that seal 76 is substantially in the same plane as seal 72 and therefore the piston will not be subjected to bursting stresses as described with relation to Figure 1. The construction of Figure 3 is advantageous where stresses in piston rod 60 do not permit the forming of a groove therein.

Figure 4:
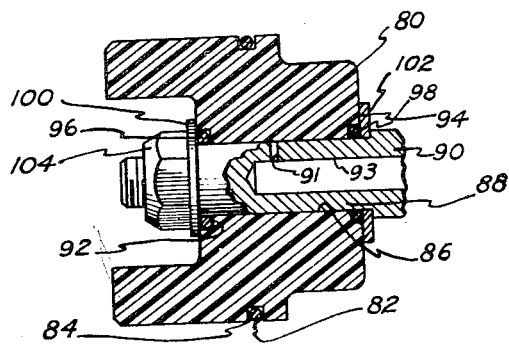
Figure 4 is an enlarged view in full section of a second modification of a piston made according to the invention.

Shown in Figure 4 is a piston 80 of plastic material having an external annular groove 82 in which is placed a seal 84. Formed in the center of piston 80 is a hole 86 through which is passed a reduced portion 88 of a piston rod 90. The piston 80 is recessed at either end of hole 86, the left end at 92 and the right end at 94. Placed within recess 92 is a sealing ring 96 and placed within recess 94 is a sealing ring 98. Washers 100 and 102 are placed over the left and right ends of piston 80, respectively, and are compressed by a nut 104 to hold the piston 80 to piston rod 90. Piston rod 90 is hollow as indicated at 93 and a small passage 91 connects the piston hole 86 with hole 93.

It will be noted that seal 84 is intermediate piston rod seals 96 and 98. It could however be placed in the same plane as seal 96, in which case the piston would operate satisfactorily with the single internal seal 96, because it would be free from bursting pressures. However, if it is desired to relieve the hole 86 from any fluid pressure whatsoever, a second seal may be employed such as 98 to seal the other end of hole 86. This construction is particularly advantageous where the external seal is at a point between the two ends of the hole 86, as shown, and it is inadvisable to place a seal on the piston rod as shown in Figure 1, or place a seal within the piston as shown in Figure 3. When both ends of hole 86 are sealed, the stresses are compressive in nature as regards radial direction, the piston will not be damaged. The passage 91 permits any leakage past seals 96 or 98 to flow into piston rod hole 93 which acts as a reservoir, preventing the build-up of internal bursting pressures by leakage.

Although this invention has been described with reference to particular embodiments thereof it is not limited to these embodiments nor otherwise except by the terms of the following claims:

We claim:

1. Fluid pressure apparatus comprising: an outer member having a cylindrical inner surface, opposite ends of which are exposed to different fluid pressures; an inner member coaxial with said outer member and having a cylindrical outer surface of substantially smaller diameter than said inner surface of said outer member; a solid annular member impervious to flow radially therethrough, and loosely fitted between the said inner and outer cylindrical surfaces, said annular member being distortable in response to unbalanced radial forces acting thereagainst; a first annular sealing means interposed between said annular member and one of the said cylindrical surfaces for preventing leakage of fluid therepast; and means for balancing radial forces on said annular member resulting from fluid pressure against that portion thereof between said first sealing means and the high pressure end of said annular member, comprising second annular sealing means interposed between said annular member and the other of said cylindrical surfaces; each of said sealing means being spaced axially substantially the same distance from said high pressure end of said annular member whereby the portions of the inner and outer surfaces of said annular member exposed to said high pressure are substantially axially coextensive with each other.

2. Apparatus as described in claim 1 including means for successively subjecting said annular member to fluid pressures on opposite ends thereof and in which said two annular sealing means are axially spaced substantial distances from both ends of the annular member.

3. Apparatus as described in claim 1 in which said annular member is reciprocal with respect to one of said inner and outer members and is formed of an organic plastic material, the tensile strength of which is low relative to its strength in compression.

4. Hydraulic apparatus comprising: a cylinder and means to admit pressure fluid to either end thereof; a piston in said cylinder having an annular seal between its outer surface and said cylinder axially spaced a substantial distance from both ends of the piston; a piston rod extending through a hole provided therefor in said piston; means securing said piston against movement with respect to said piston rod while permitting leakage of fluid between the piston and the piston rod; and annular sealing means between said piston rod and piston radially juxtaposed to said first-mentioned annular sealing means, each end of the piston being spaced axially substantially the same distance from both of said sealing means, whereby pressure fluid acting against either end of said piston is applied to portions of the inner and outer surfaces of the piston that are substantially of equal axial dimensions and axially coextensive with each other.

5. In hydraulic apparatus, a piston structure for use in a cylinder, said structure comprising: a solid annular piston member of organic plastic material; a piston rod extending through said piston member; means mechanically securing the rod to the piston member for movement therewith while permitting fluid leakage axially between the piston member and said rod; an external annular seal on the outer surface of said piston member spaced axially a substantial distance from both ends of the piston member for sealing with the cylinder in which the piston member is to be used; and an internal annular sealing means substantially axially coextensive with the external seal for effecting a seal between the piston member and said rod; each end of the piston being spaced axially substantially the same distance from both of said sealing means, whereby pressure fluid acting against either end of said piston is applied to portions of the inner and outer surfaces of the piston that are substantially of equal axial dimensions and are axially coextensive to each other.

6. Fluid pressure apparatus comprising: a wall subject to higher pressure on one side than on the other and having an aperture therethrough; a rod reciprocal through said aperture; and means for effecting a fluid seal between said rod and said aperture comprising an annular bushing in said aperture, said bushing being distortable in response to unbalanced radial forces applied thereto; means for mechanically retaining said bushing in said aperture while permitting fluid leakage between the contacting surfaces of the bushing and the aperture; first annular sealing means spaced axially a substantial distance from the high pressure end of said bushing as compared to the radial thickness of said bushing for sealing between the rod and said bushing;

and second annular sealing means substantially radially juxtaposed to said first sealing means for sealing between the contacting surfaces of said bushing and said aperture; each of said sealing means being spaced axially substantially the same distance from the high pressure end of said bushing whereby the portions of the inner and outer surfaces of said bushing exposed to high pressure are substantially axially coextensive with each other.

JOHN P. PHILLIPS.
LOUIS F. RIDDER, Jr.

REFERENCES CITED

The following references are of record in the file of this patent:

UNITED STATES PATENTS

| Number | Name | Date |
|---|---|---|
| 1,981,782 | D'Aubigne | Mar. 20, 1934 |
| 2,285,679 | Pontius | June 9, 1942 |
| 1,407,667 | De Lukacsevics | Feb. 21, 1922 |
| 1,182,258 | Engel | May 9, 1916 |
| 2,180,795 | Christensen | Nov. 21, 1939 |
| 1,481,160 | Switzer | Jan. 15, 1924 |
| 2,279,238 | Larson | Apr. 7, 1942 |
| 2,284,340 | Nuckles | May 26, 1942 |
| 1,974,362 | Marsh | Sept. 18, 1934 |
| 1,804,088 | Clark | May 5, 1931 |
| 2,000,349 | Olsen | May 7, 1935 |
| 2,188,854 | Chievitz | Jan. 30, 1940 |
| 2,214,261 | Roth | Sept. 10, 1940 |
| 2,114,908 | Peterson | Apr. 19, 1937 |
| 1,499,677 | Mason | July 1, 1924 |
| 1,325,996 | Rolland | Dec. 23, 1919 |
| 1,612,038 | Miller | Dec. 28, 1926 |
| 2,209,032 | Mott | July 23, 1940 |
| 1,801,391 | Sheldon | Apr. 21, 1931 |
| 1,100,799 | Wedig | June 23, 1914 |
| 1,437,262 | Newkirk | Nov. 28, 1922 |
| 468,730 | Shepard | Feb. 9, 1892 |
| 1,346,722 | Rimailho | July 13, 1920 |